United States Patent [19]

Haas

[11] Patent Number: 5,300,890

[45] Date of Patent: Apr. 5, 1994

[54] HOT-CATHODE IONIZATION PRESSURE GAUGE INCLUDING A SEQUENCE OF ELECTRODES ARRANGED AT A DISTANCE FROM ONE ANOTHER IN SEQUENCE ALONG AN AXIS

[75] Inventor: Guenter Haas, Garching, Fed. Rep. of Germany

[73] Assignee: Max-Planck-Gesellschaft zur Foerderung der Wissenschaften e.V., Goettingen, Fed. Rep. of Germany

[21] Appl. No.: 866,869

[22] Filed: Apr. 10, 1992

[30] Foreign Application Priority Data

Apr. 16, 1991 [DE] Fed. Rep. of Germany ....... 4112407

[51] Int. Cl.$^5$ .................... G01L 21/32; H01J 41/04
[52] U.S. Cl. .................... 324/462; 324/460; 250/389; 313/631
[58] Field of Search .......... 324/459, 460, 462, 464, 324/468, 470; 313/358, 600, 632, 631; 315/111.91; 250/382, 389

[56] References Cited

U.S. PATENT DOCUMENTS

| | | | |
|---|---|---|---|
| 3,743,876 | 7/1973 | Redhead | 324/462 X |
| 3,891,882 | 6/1975 | Barraco | 324/462 X |
| 4,144,472 | 3/1979 | van Loon et al. | 313/631 X |
| 4,792,763 | 12/1988 | Haas . | |

FOREIGN PATENT DOCUMENTS

| | | | |
|---|---|---|---|
| 3206934 | 9/1991 | Japan | 324/460 |
| 2195495 | 11/1990 | United Kingdom . | |

*Primary Examiner*—Gerard R. Strecker
*Assistant Examiner*—Diep Do
*Attorney, Agent, or Firm*—Nields & Lemack

[57] ABSTRACT

A hot cathode ionization pressure gauge with the following electrodes, arranged at a distance from one another in the specified sequence along an axis:

(a) a thermionic cathode filament which has a central active part and lateral support parts;
(b) an essentially flat, diaphragm-like control electrode,
(c) an essentially flat apertured acceleration electrode and
(d) an essentially flat ion collector electrode,
(e) a base plate on which the filament, the control electrode, the acceleration electrode and ion collector electrode are mounted, wherein the base plate consists of a ceramic material and has a plurality of through holes, and each of said control, acceleration and ion collector electrodes comprises a support member having essentially a shape of an inverted "U" with first and second legs, one of said legs of each electrode support member extending through a corresponding hole of said base plate and being fixed therein.

3 Claims, 10 Drawing Sheets

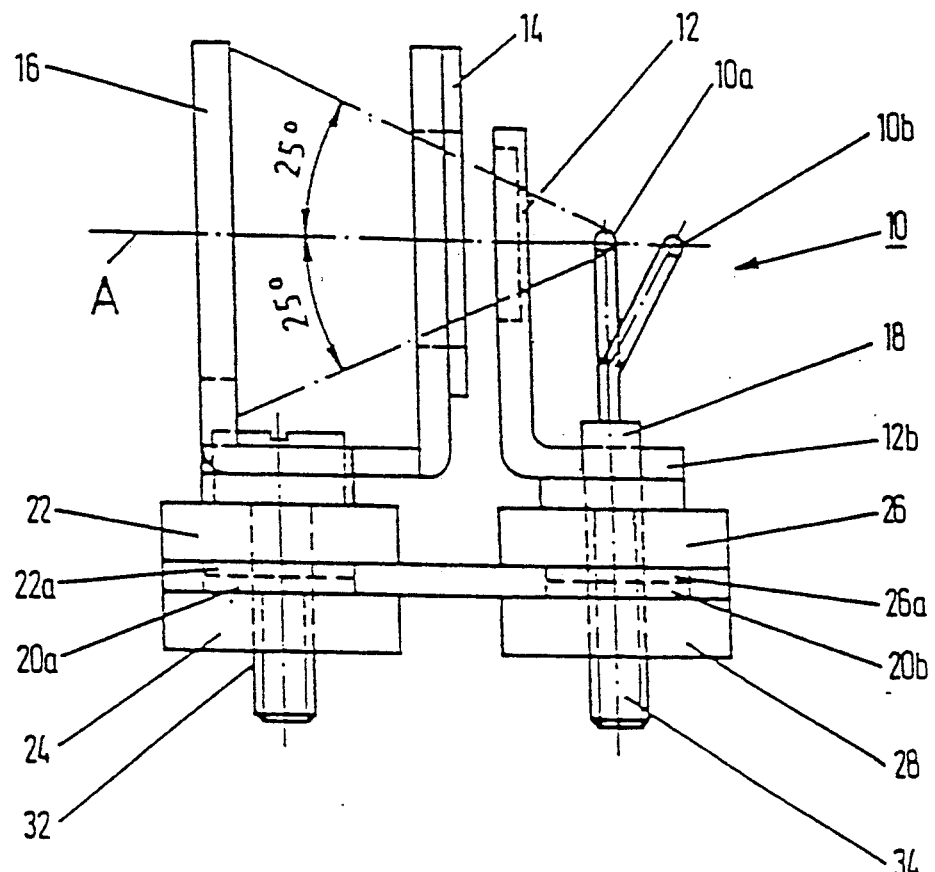
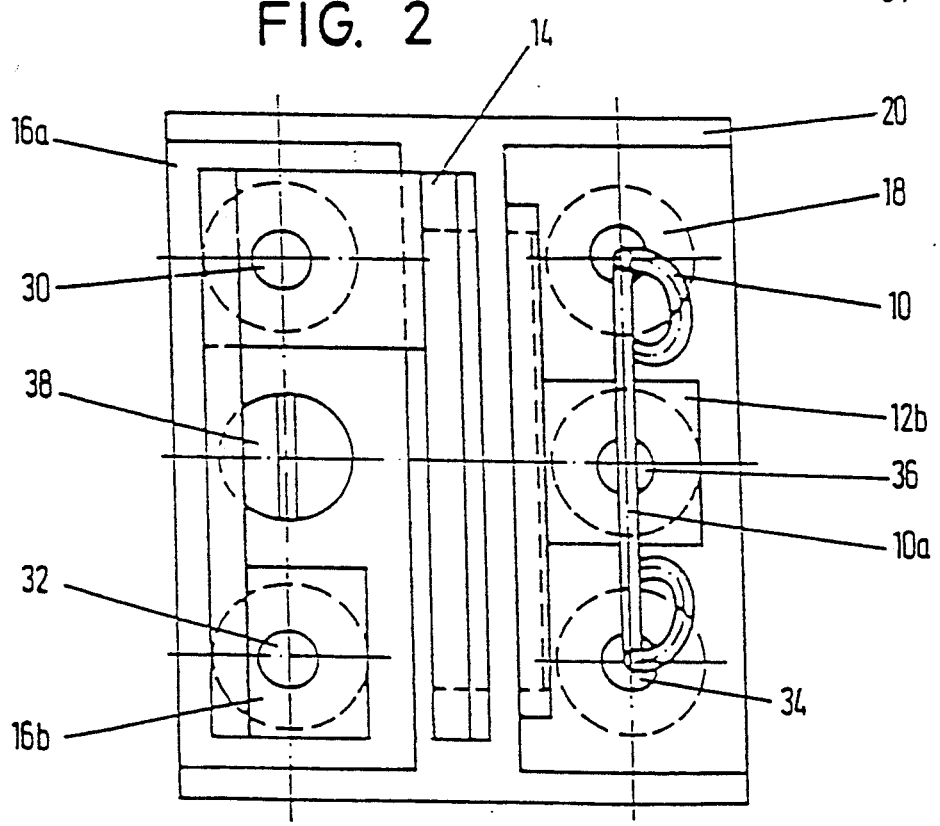

FIG. 11a
FIG. 11b
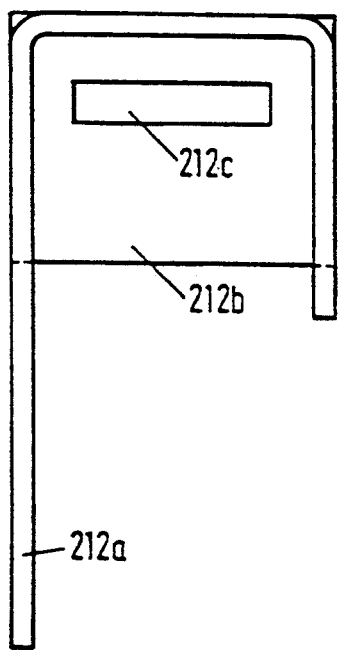
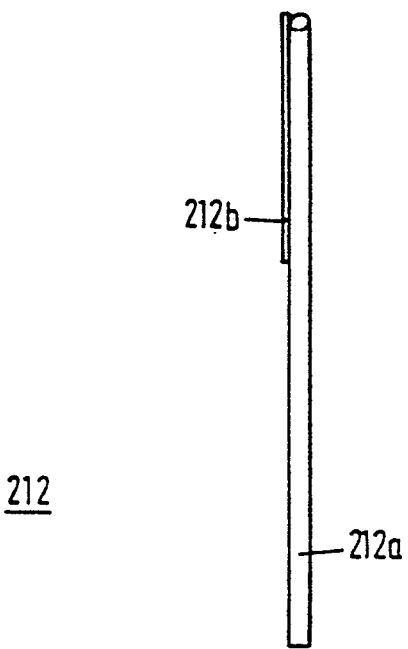

ABSTRACT
HOT-CATHODE IONIZATION PRESSURE GAUGE INCLUDING A SEQUENCE OF ELECTRODES ARRANGED AT A DISTANCE FROM ONE ANOTHER IN SEQUENCE ALONG AN AXIS

FIELD OF THE INVENTION

The present invention relates to a hot-cathode ionization pressure gauge.

BACKGROUND OF THE INVENTION

A hot-cathode ionization pressure gauge having the following electrodes, arranged at a distance from one another in the specified sequence along an axis,
(a) a thermionic cathode filament which has a central active part and lateral loop-shaped support parts;
(b) a flat, diaphragm-like control electrode,
(c) a flat acceleration electrode and
(d) a flat ion collector electrode,
and having a base plate on which the control electrode, the acceleration electrode and the ion collector electrode are mounted, in each case via a foot or bracket running at right angles to the main part of the relevant electrode and via a support bolt connected to the bracket is disclosed in UK Patent GB 2,195,495 B, FIG. 7. The control electrode, the acceleration electrode and the ion collector electrode each have a support foot or bracket on the lower edge, projecting at right angles, which is screwed to a support bolt which is also used for the electrical connection. The support bolts pass through a metal base plate, from which they are insulated by ceramic bushes. This design is complicated and must be assembled very carefully since the ceramic bushes break easily.

SUMMARY OF THE INVENTION

It is an object of the present invention to provide a hot-cathode ionization pressure gauge of the above type which is more robust and simpler to manufacture and assemble and can be constructed with smaller dimensions.

The invention features a hot-cathode ionization pressure gauge having the following electrodes, arranged at a distance from one another in the specified sequence along an axis:
(a) a thermionic cathode filament which has a central active part and lateral support parts;
(b) a flat, diaphragm-like control electrode,
(c) a flat acceleration electrode and
(d) a flat ion collector electrode,
and having a base plate on which the control electrode, the acceleration electrode and the ion collector electrode are mounted, in each case via a foot or bracket running at right angles to the main part of the relevant electrode and via a support bolt connected to the bracket.

According to a general aspect of the present invention the electrodes are supported by flat insulating means, such as ceramic means.

According to a first specific aspect of the invention the support bolts are in each case held on the base plate via strip-shaped ceramic bars, the base plate consisting of metal.

According to a second specific aspect of the invention, the base plate is made of a ceramic material and is provided on at least one of its opposite main surfaces with a metal layer which ends at a distance from the edges of the holes accommodating the support bolts.

The flat ceramic means can contain ceramic bars which run at right angles to the axis of the electrode system and, for their part, are mounted on a metal base plate, or they can be formed by a single-piece, integral ceramic plate which is partially metallised at least on one of its opposite main surfaces.

The acceleration electrode and the ion collector electrode may each have an angled foot which is connected, preferably welded, to a connecting bolt, the ion collector electrode and the acceleration electrode being held by means of mutually facing feet on a first ceramic bar arrangement or the ceramic base plate and being designed such that the foot or bracket of one of these electrodes reaches beneath the lower edge of the other electrode without touching it. In the case of support by ceramic bars, the control electrode and the filament are held on a second ceramic bar arrangement which is mounted on the base plate at an axial distance from the first ceramic bar arrangement. Each ceramic bar arrangement contains preferably one bar of glass ceramic and a second bar of aluminium-oxide ceramic.

The control electrode and the acceleration electrode have apertures which are aligned with the active part of the filament and the ion collector electrode is so large that, seen from the active part of the filament, it extends over the complete "field of view" defined by the apertures of the control and acceleration electrodes.

The present hot-cathode ionization pressure gauge is simple in construction, robust and easily assembled. It can be constructed in a very small manner so that it can be used not only in constrained conditions but also has a shorter response time than the known ionization pressure gauge mentioned above. It has furthermore been found that the angle range ("aperture angle"), within which the direction of a magnetic field in which the ionization pressure gauge is operated can vary without adversely affecting the operation of the ionization pressure gauge, is considerably larger than in the known case.

BRIEF DESCRIPTION OF THE DRAWINGS

Preferred exemplary embodiments of the invention are explained in detail with reference to the drawings, from which further features and advantages of the invention will become apparent.

In the drawings:
FIG. 1 is a simplified, enlarged view of an electrode system with the associated support of a hot-cathode ionistion pressure gauge according to a first embodiment of the invention;
FIG. 2 is a plan view of the electrode system according to FIG. 1.

FIG. 11a is a front view and FIG. 11b is a side view of a control electrode of the third embodiment.

DESCRIPTION OF THE PREFERRED EMBODIMENTS

Figure 3A:
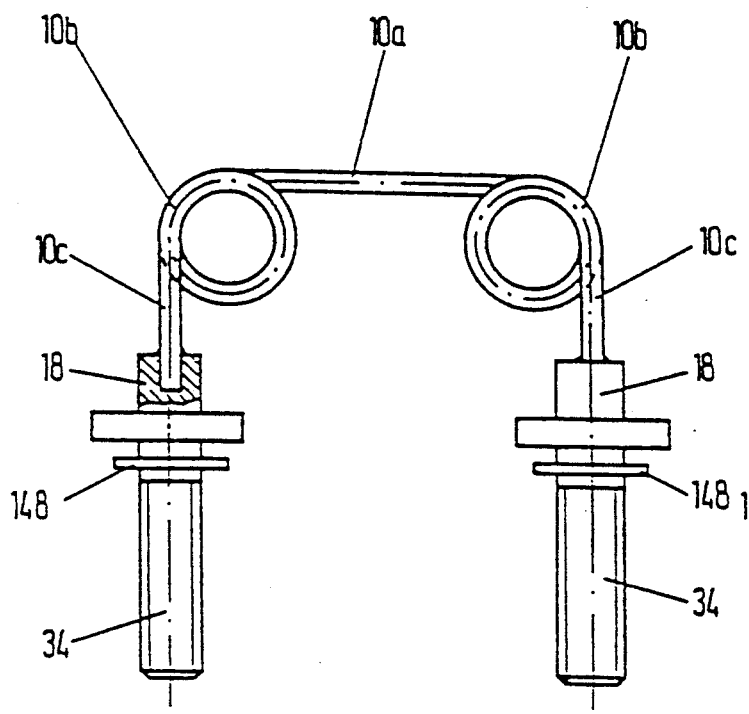
FIG. 3a is a front view and FIG. 3b is a side view of the filament of the ionization pressure gauge according to FIGS. 1 and 2.
Figure 3B:
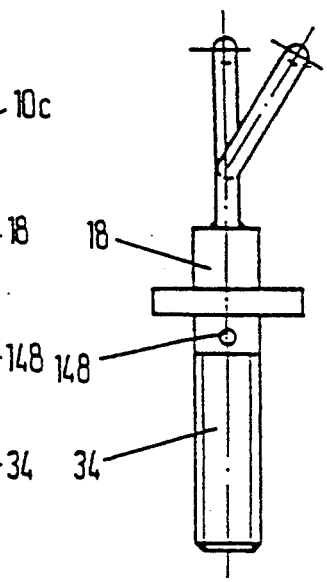

The embodiment of the present hot-cathode ionization pressure gauge shown in FIGS. 1 to 7 contains a filament consisting of a thoriated tungsten wire which is approximately 0.4 to 0.8 mm, in particular 0.6 mm, thick, furthermore a flat control electrode 12, a flat acceleration electrode 14 and a flat ion collector electrode 16, which electrodes are arranged in the specified sequence along an As FIG. 3 shows in more detail, the filament contains a central, straight active part 10a and two loop-shaped lateral parts 10b which serve for heat insulation and merge into straight parts 10c, each of which is brazed into a metal base 18.

Figure 4A:
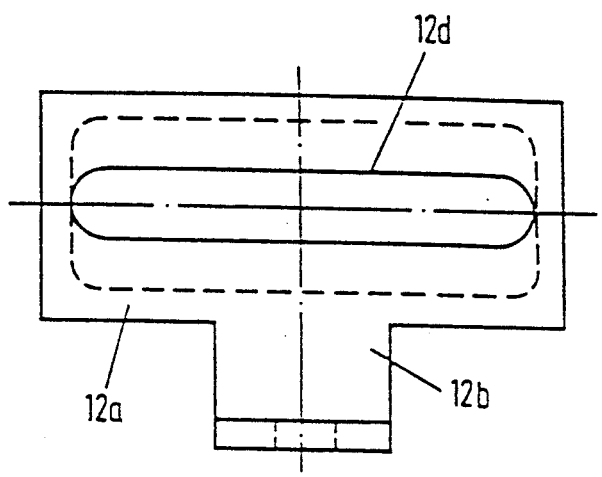
FIG. 4a is a plan view and FIG. 4b is a side view of the control electrode of the ionization pressure gauge according to FIGS. 1 and 2.
Figure 4B:
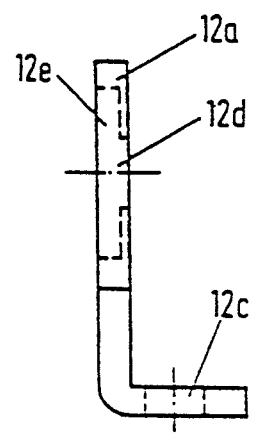

The control electrode 12, shown in more detail in FIG. 4, contains a flat, plate-shaped part 12a and an L-shaped foot part 12b, which is integral therewith, starts at the center of the longitudinal side of the plate-shaped part 12a and has a mounting hole 12c in the angled leg. The plate-shaped part 12a has a slot-shaped perforation 12d which is surrounded by a milled recess 12e such that the part of the control electrode surrounding the perforation is relatively thin, so that it is not so easily warped during the heating occurring in operation from the heat emitted by the filament.

Figure 5A:
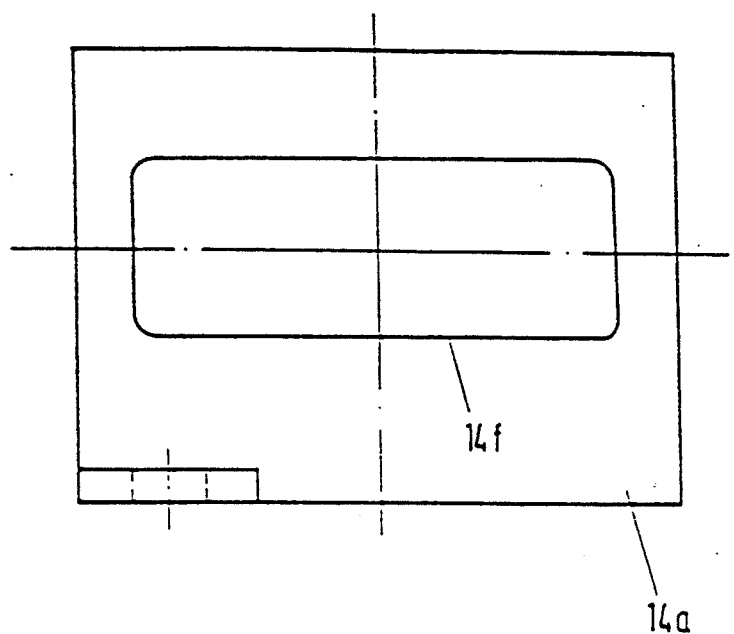
FIG. 5a is a front view and FIG. 5b is a side view of a first frame part of the acceleration electrode.
Figure 5B:
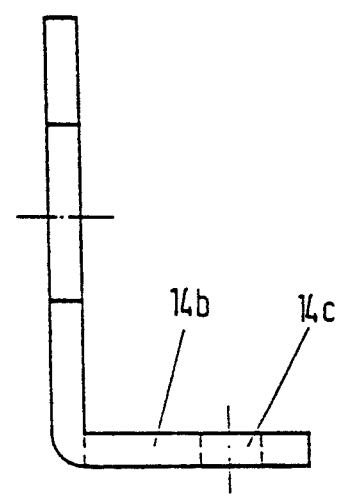
Figure 5C:
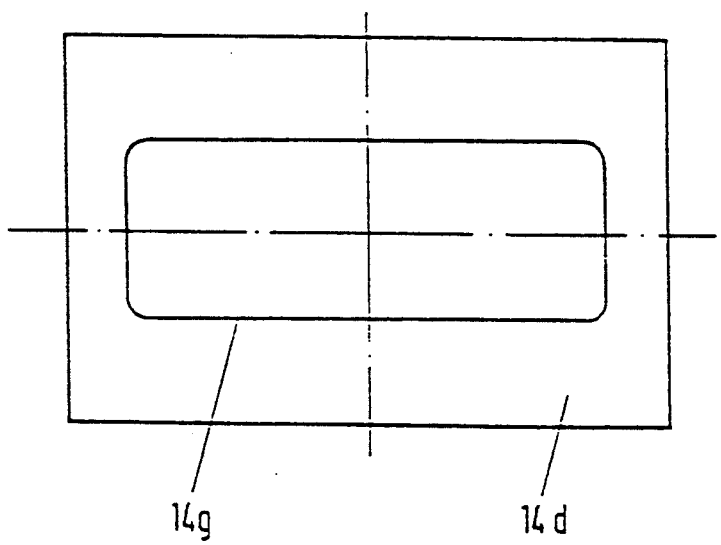
FIG. 5c is a front view of a second frame part of the acceleration electrode.
Figure 5D:
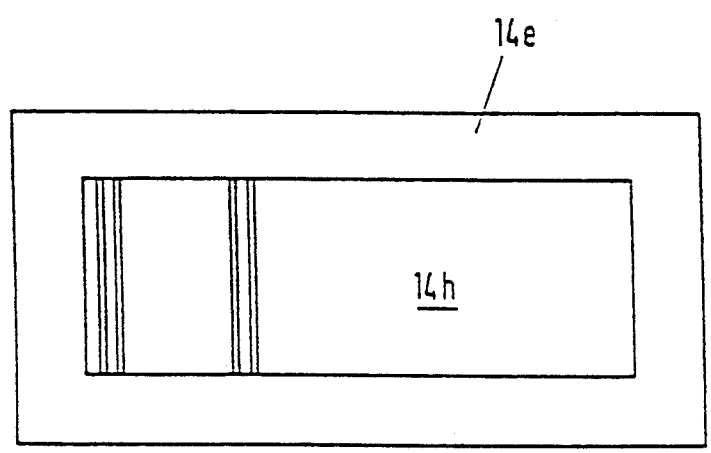
FIG. 5d is a front view of a grid insert of the acceleration electrode.

As shown in FIGS. 5a to 5d, the acceleration electrode 14 is a three-piece design. It contains a first, plate-shaped frame part 14a which has an integral, angled support part or bracket 14b on the one longitudinal side. The bracket 14b has a mounting hole 14c. The acceleration electrode furthermore contains a second, rectangular frame part 14d (FIG. 5c) and a grid insert 14e (FIG. 5d). The two frame parts each have a rectangular window 14f, 14g and the grid insert 14e has a grating-like window 14h in a central region, corresponding to the windows 14f, 14g, with a number of parallel vertical slots whose number and width can differ depending on the application of the ionization pressure gauge, which will be described in more detail.

During production of the acceleration electrode, the first frame part 14a (FIG. 5a), the grid insert 14e (FIG. 5d) and the second frame part 14d (FIG. 5c) are placed one on top of the other so that the windows 14f, 14g and 14h are in alignment and the three parts are then connected to one another by spot welding.

Figure 6A:
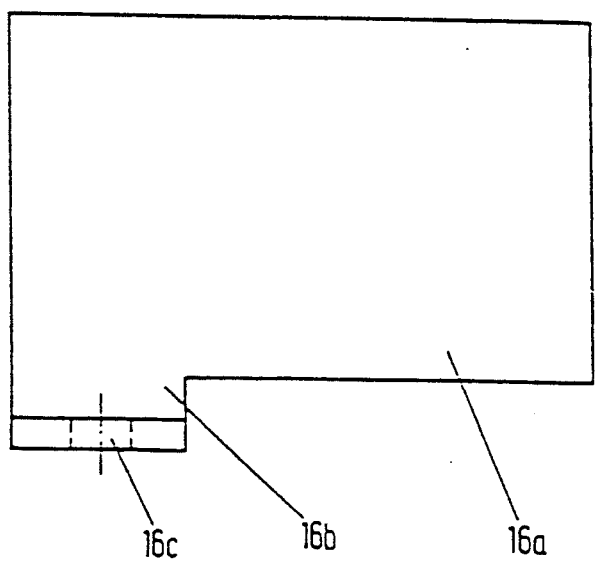
FIG. 6a is a front view and FIG. 6b is a side view of the ion collector electrode of the ionization pressure gauge according to FIGS. 1 and 2.
Figure 6B:
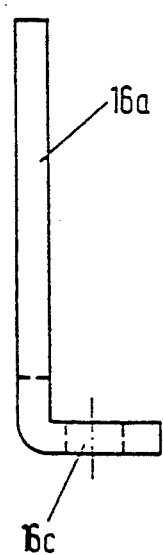

The ion collector electrode 16, shown in more detail in FIG. 6, has a solid plate-shaped part 16a and an integral, short, L-shaped support part or bracket 16b, which starts at one end of the lower longitudinal edge of the plate-shaped part 16a and has a mounting hole 16c in the horizontal leg or bracket. The vertical leg of the support part which is aligned with the plate-shaped part 16a is so high that the horizontal leg or bracket of the support part 14b of the acceleration grid can extend beneath the lower edge of the part 16a without touching it. This allows the ion collector electrode to be arranged closer to the acceleration electrode than in the case of the already mentioned, known ionization pressure gauge, as a result of which not only are the dimensions reduced but it is also ensured that the ion collector electrode covers the complete "field of view" of the active part of the filament bounded by the apertures of the control electrode and of the acceleration electrode.

As FIGS. 1 and 2 show, the electrodes described are supported on a metal base plate 20 via pairs of ceramic bars 22, 24 and 26, 28 respectively. The ceramic bars 22, 26 are comprised of glass ceramic; the ceramic bars 24, 28 of aluminium-oxide ceramic.

The angled support parts or brackets of the electrodes 12, 14 and 16 are each riveted to a support bolt 36, 30 and 32 whose head extends through the relevant mounting hole 12c, 14c and 16c respectively. The support bolts each have an external thread. The metal base or feet 18 of the filament connections are formed by corresponding screw bolts 34.

The support bolts 30, 32 of the acceleration electrode 14 and of the ion collector electrode 16 are seated in the first pair 22, 24 of ceramic bars, while the support bolts 34, 36 of the filament and of the control electrode, respectively, are seated in the other two ceramic bars 26, 28. There is a grounded screw 38 between the support bolts 30, 32.

The ceramic bars 24, 28, consisting of $Al_2O_3$ have only three holes. The glass-ceramic bars 22, 26 additionally have a bar-like projection 22a and 26a, respectively, on their lower side facing the base plate 20, which projections each engage in a slot 20a or 20b, respectively, in the base plate. As will be explained in an analogous manner below with reference to FIG. 8, short lateral slots (or one continuous slot) are provided on the top of the glass-ceramic bars on the right and left of the holes for the support bolts, into which slots lateral pins engage which are seated in lateral holes in the support bolts and prevent rotation of the support bolts when nuts 40 (FIG. 7), which hold the arrangement together, are screwed onto the support bolts. The arrangement described also absorbs the torques of cables (not shown) which are fitted together with the support bolts via cable shoes, plugged or screwed-on bushes, soldered to the connecting cables, or the like.

Figure 7:
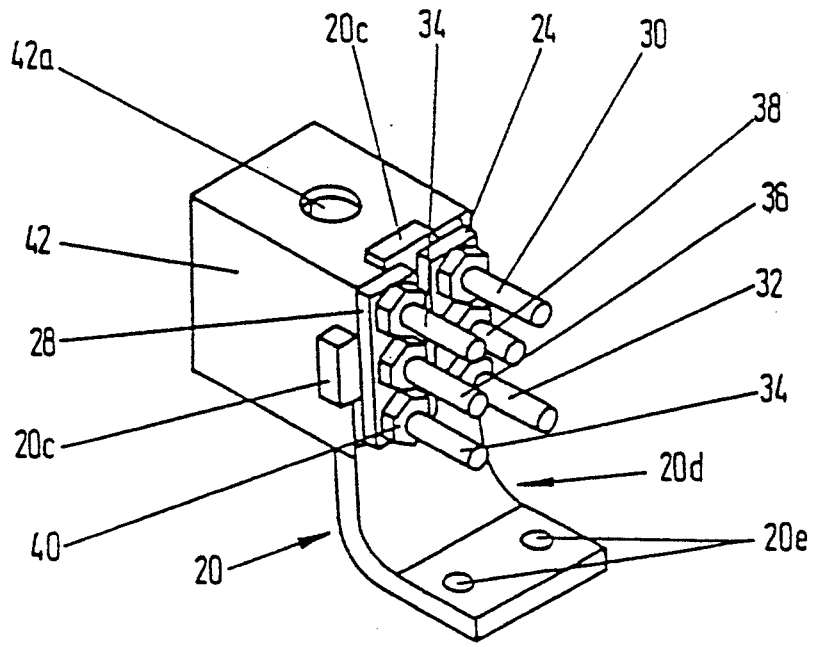
FIG. 7 is a perspective view of the ionization pressure gauge according to FIGS. 1 to 6 with a housing.

The screw 38, which is seated in a central hole in the ceramic bars 22, 24 and is grounded via the base plate 20, prevents leakage currents from the acceleration grid holder to the ion collector holder The arrangement described is simple to assemble, highly reliable and very space-saving, since no additional means is necessary for connection of the cables. As FIG. 7 shows, the metal base plate 20 has an approximately L-shaped extension 20d, with mounting holes 20e, which is used for assembly. Furthermore, on its right, left and top sides it has in each case one positioning projection 20c, for a metal housing 42, which has at least one gas-inlet hole 42a and is welded to the base plate. The base plate 20 can also have an angled flange for fixing the housing with screws or the like on each of two opposite sides. The fixing can also take place advantageously by means of a flange or the like provided on the housing.

In the case of a practical embodiment of the invention, the electrodes 12 and 16 and the frames 14a and 14d of the acceleration electrode each consisted of 1 mm thick stainless steel sheet material. The control electrode 12 had a slot-shaped opening with a height of 2.5 mm and a width of 16 mm. In the region of the milled recess, which was 8×16 mm large, the thickness was approximately 0.2 mm. The windows of the acceleration grid were 6 mm high and 16 mm wide. The free distances between the active part of the filament and the control electrode and between the latter and the acceleration grid were in each case approximately 1 mm. The distance between the acceleration electrode 14 and the ion collector 16 was 7.5 mm, and the filament 10 as well as the openings of the control electrode 12 and of the acceleration grid, were arranged with respect to the ion collector 16 such that the latter extends over the complete height range of an angle sector (FIG. 1) which, in the case of the present exemplary embodiment, is ±25° large with respect to the axis A and is bounded by straight lines which pass from the active part of the filament through the upper or lower edge of the slot-shaped opening 12d of the control electrode and through the upper or lower edge of the resulting window of the acceleration electrode 14.

In preferred embodiments, the slots and rods of the acceleration electrode have the following dimensions:

| Type I: | 2 slots/mm; slot width 0.4 mm; rod width 0.1 mm. |
| Type II: | 2 slots/mm; slot width 0.1 mm; rod width 0.4 mm. |
| Type III: | 4 slots/mm; slot width 0.15 mm; rod width 0.1 mm. |

The grid insert 14e may consist of a 50 μm thick foil of molybdenum, alternatively of beryllium-bronze or stainless steel.

The housing 42 surrounds the electrode system at a small distance, e.g. 1 mm.

In this context, the term "glass ceramic" is intended to be respective of all ceramic materials which can be processed, e.g. milled, relative easily.

Figure 8:
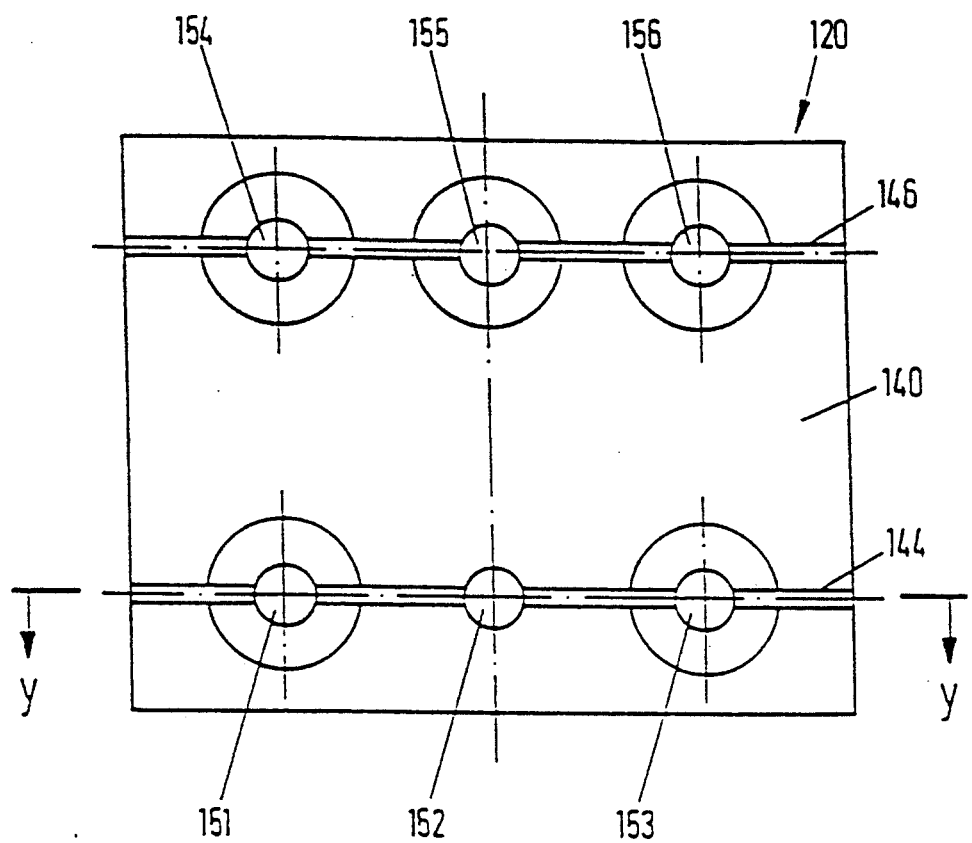
FIG. 8 is a plan view of a ceramic base plate for an ionization pressure gauge according to a further embodiment of the invention.
Figure 9:
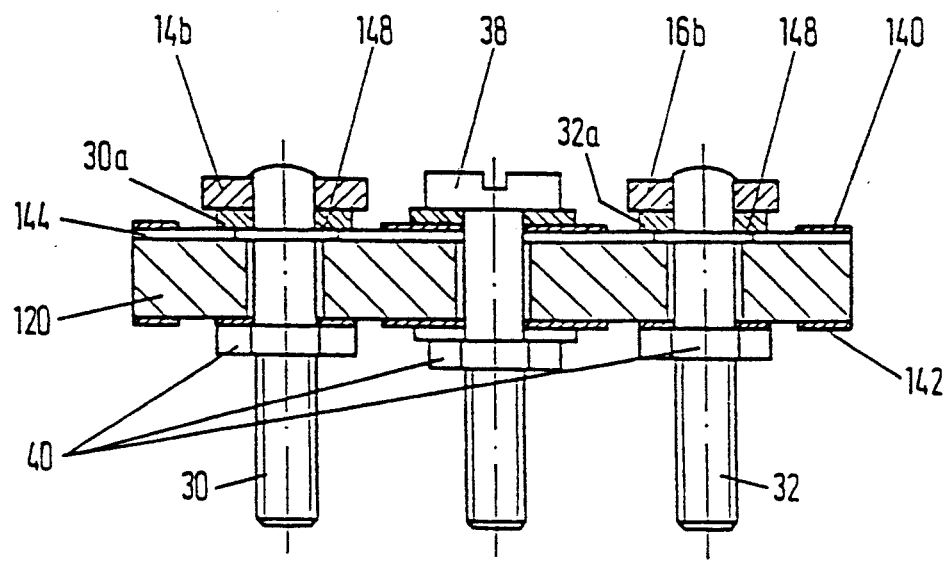
FIG. 9 is a section in a plane 9—9 in FIG. 8, in which further parts of the ionization pressure gauge are shown.

In a second embodiment of the invention, which is shown in FIGS. 8 and 9, a ceramic base plate 120 is used instead of the metal base plate 20 and the ceramic bars 22 to 28.

The ceramic base plate 120 has six holes 151 to 156, which correspond to the holes in the ceramic bars and receive the support bolts of the electrodes. The top surface of the base plate is coated with a layer 140 of gold or another suitable metal, which ends at such a distance from the edge of the holes, with the exception of the hole holding the grounded screw, that the support bolts 30, 32 make no contact with the grounded metal layer with their heads and, if applicable, washers 30a and 32a respectively placed beneath them. A corresponding layer 142 is also provided on the lower side of the ceramic plate. The top of the ceramic plate is furthermore provided with two grooves 144, 146 which pass through the holes 151 to 153 and 154 to 156 respectively and hold the lateral pins 148 which were mentioned above and are used to prevent rotation. In other respects, the design corresponds to that according to FIGS. 1 to 7. Mounting may be effected via the housing, which is not shown, or by means of the grounded screw 38.

The design explained with reference to FIGS. 8 and 9 can be even further simplified by fixing the support bolts 30, . . . in the corresponding holes 151 to 156 by means of a heat-resistant ceramic adhesive, glass solder, hard solder or the like. The nuts 40 can then be omitted and assembly is correspondingly simplified.

Figure 10A:
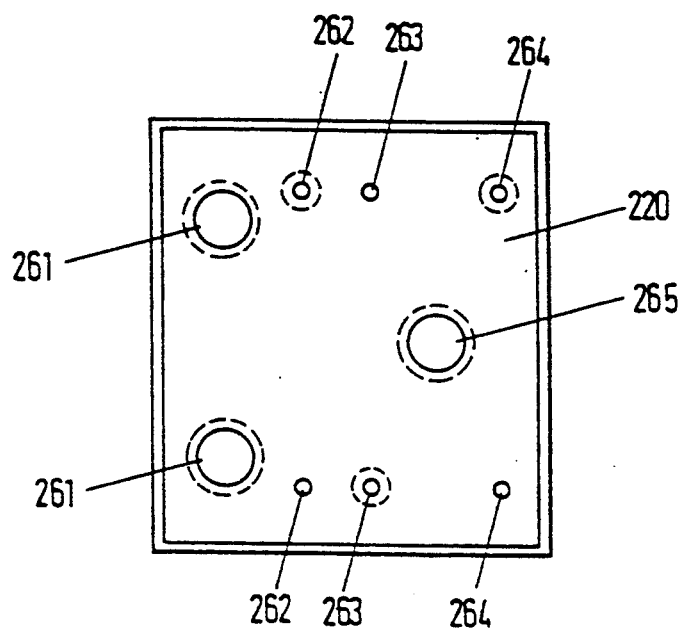
FIG. 10a is a plan view and FIG. 10b is a front view of a base plate of a third embodiment of the invention.
Figure 10B:
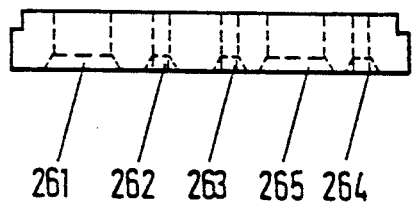
Figure 12A:
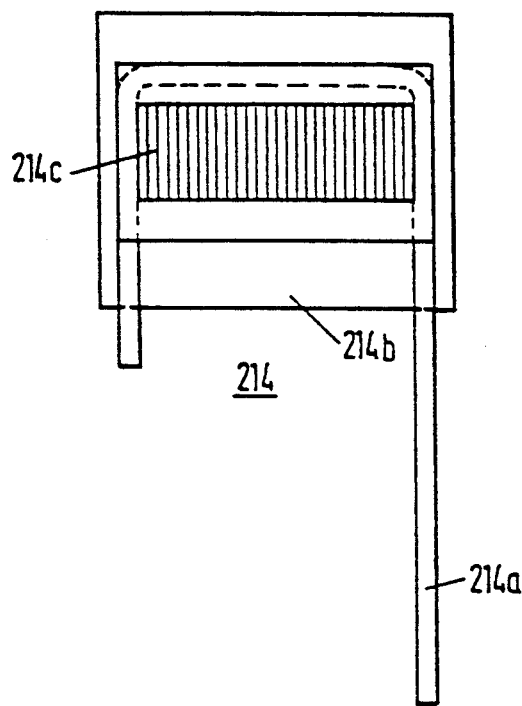
FIG. 12a is a front view and FIG. 12b is a side view of an acceleration electrode of the third embodiment.
Figure 12B:
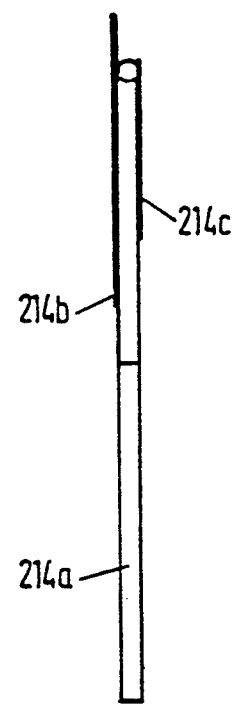
Figure 13A:
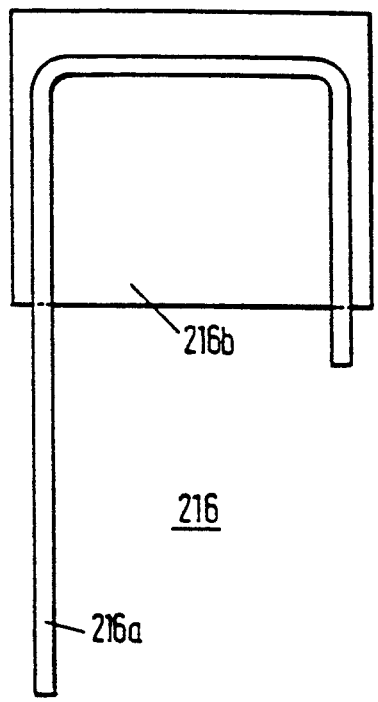
FIG. 13a is a front view and FIG. 13b is a side view of an ion collector electrode of the third embodiment.
Figure 13B:
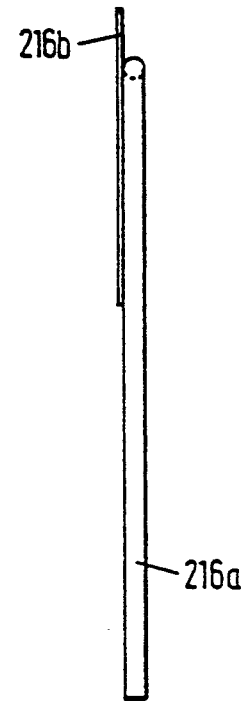

A third, at present preferred embodiment of the invention, the parts of which being shown in FIGS. 10 to 13, comprises a base plate 220 shown in plane and front views in FIG. 10. The base plate 220 is made of a ceramic material, as $Al_2O_3$ ceramic, and is a square part which is provided with first 261, second 262, third 263 and fourth 264 pairs of through holes, and an additional single hole 265 positioned as shown in FIG. 10. The base plate 220 is provided with a metal coating (not shown) as described with reference to FIGS. 8 and 9. One through hole of each of the pairs 262 to 264 is conically countersunk at the bottom surface of the base plate 220 as shown in the front view part of FIG. 10 by dashed lines. The countersunk holes of pairs 262 and 264 are laterally offset with respect to the countersunk hole of pair 263. The pair of holes 261 receive support bolts of a cathode filament as shown in FIG. 3. The pair of holes 262 receive legs of a support member 12a of a control electrode shown in FIG. 11; the pair of holes 263 electrode 14 (FIG. 12) and the pair of holes 264 receive legs of a support member 16a of an ion collector electrode 16 (FIG. 13). The hole 265 receives a bolt which serves as ground connection and may also be used as mechanical support of the pressure gauge.

The control electrode 212 is shown in FIG. 11. The support member is a stirrup or approximately inverted U-shaped piece of wire having one long leg and one short leg. The control electrode further comprises a plate 212b of sheet metal which has an elongated slot 212c and is spot-welded to the support member 212a.

The acceleration electrode 214 is shown in FIG. 14. The support member 214a is similar to the support member 212a with the exception that the long legs of the support members 212a and 214a are on opposite sides. The acceleration electrode 214 further comprises a frame part 214b of sheet metal and a thin foil 214c spot-welded to opposite sides of the support member 214a as shown in the right-hand part of FIG. 12. The foil 214c has an apertured portion forming a plurality of elongated vertical slots as described with reference to FIG. 5d.

The ion collector electrode 216 is shown in FIG. 13. The support member 216a is similar to the support member 212a of the control electrode 212. The ion collector electrode further comprises a collector plate 216b of sheet metal which is spot-welded to the support member 216a.

The filament is mounted on the base plate 220 by nuts and washers as shown e. g. in FIG. 1. The other electrodes are mounted by pushing the long leg of the support member of the respective electrode through the countersunk hole of the respective pair of holes until the shorter leg engages the other hole of the pair. The long leg is then fixed in the countersunk hole by a commercially available active ceramic solder material. The short leg extends freely in the other hole of the pair. The long legs also serve as electrical leads for the respective electrodes. A housing (not shown) as described with reference to FIG. 7 is attached to the base plate 220. The electrodes are aligned as described with reference to the first and second embodiments. The apertures parts of the control and acceleration electrodes have upper and lower edges which form an angle of about 25 degrees with the active portion of the filament as shown in FIG. 1.

In a practical embodiment, the base plate 220 was made of shapal ™. The support members 212a, 214a and 216a were made of 1 mm stainless steel wire. The plate 212b of the control electrode, the frame part 214b of the acceleration electrode and the plate 216b of the ion collector electrode were made of 0.2 mm stainless steel sheet material. The foil 14c is a 50 μm thick stainless steel sheet. Any thickness between 50 μm and 150 μm gives satisfactory results.

I claim:

1. A hot cathode ionization pressure gauge comprising in combination:
   a base plate (220) of a ceramic material and having an axis and having a plurality of through holes,
   a thermionic cathode filament which has a central active part and lateral support parts;
   an essentially flat, diaphragm-like control electrode (212),
   an essentially flat apertured acceleration electrode (214) and
   an essentially flat ion collector electrode (216),
   the filament, the control electrode, the acceleration electrode and ion collector electrode being mounted on said base plate at a distance from one another in the sequence a, b, c, d along said axis,
   wherein each of said control, acceleration and ion collector electrodes (212, 214, 216) comprises a support member having essentially a shape of an inverted "U" with first and second legs, one of said legs of each electrode support member extending through a corresponding hole of said base plate and being fixed therein.

2. The pressure gauge as claimed in claim 1, wherein the leg which extends through the base plate is longer than the other leg of the support member, said other leg extending into hole of said base plate laterally aligned with the hole through which the longer leg extends.

3. The pressure gauge as claimed in claim 1 wherein said control and acceleration electrodes have apertures defined by upper and lower edges, said edges forming an angle of about 25 degrees with the active part of the cathode filament.

* * * * *